(12) United States Patent
Lee et al.

(10) Patent No.: US 8,598,264 B2
(45) Date of Patent: *Dec. 3, 2013

(54) ADHESIVE COMPOSITIONS

(75) Inventors: Chun D. Lee, Cincinnati, OH (US); Charles S. Holland, Springboro, OH (US)

(73) Assignee: Equistar Chemicals, LP, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/529,017

(22) Filed: Jun. 21, 2012

(65) Prior Publication Data

US 2012/0289644 A1    Nov. 15, 2012

Related U.S. Application Data

(63) Continuation of application No. 12/462,163, filed on Jul. 30, 2009, now Pat. No. 8,236,886.

(51) Int. Cl.
*C09B 67/00* (2006.01)
*C08K 5/00* (2006.01)

(52) U.S. Cl.
USPC .......................................... 524/502; 524/515

(58) Field of Classification Search
USPC ........................................................ 524/502
See application file for complete search history.

(56) References Cited

U.S. PATENT DOCUMENTS

| | | |
|---|---|---|
| 4,087,587 A | 5/1978 | Shida et al. |
| 4,298,712 A | 11/1981 | Machonis, Jr. et al. |
| 4,487,885 A | 12/1984 | Adur et al. |
| 4,774,144 A | 9/1988 | Jachec et al. |
| 5,171,908 A | 12/1992 | Rudnick |
| 5,367,022 A | 11/1994 | Kiang et al. |
| 5,439,974 A | 8/1995 | Mattson |
| 5,525,672 A | 6/1996 | Jones |
| 5,597,865 A | 1/1997 | Jackson |
| 6,716,928 B2 | 4/2004 | Botros |
| 6,838,520 B2 | 1/2005 | Etherton |
| 7,125,929 B2 | 10/2006 | Ward |
| 7,259,219 B2 | 8/2007 | Rosen et al. ................ 526/346 |
| 8,207,070 B2 * | 6/2012 | Li et al. ....................... 442/118 |
| 2006/0020067 A1 * | 1/2006 | Brant et al. .................. 524/236 |
| 2007/0054142 A1 | 3/2007 | Lee et al. |
| 2007/0282072 A1 * | 12/2007 | Hoffmann et al. ........... 525/240 |
| 2008/0032148 A1 * | 2/2008 | Lee et al. ..................... 428/523 |
| 2008/0163978 A1 | 7/2008 | Botros |

FOREIGN PATENT DOCUMENTS

| | | |
|---|---|---|
| CN | 101248135 | 8/2008 |
| WO | WO2009017588 | 2/2009 |

OTHER PUBLICATIONS

Chinese First Office Action and Search Report Mailed May 6, 2013.

* cited by examiner

*Primary Examiner* — Hui Chin

(57) ABSTRACT

Adhesive compositions suitable for use as tie-layer adhesives in multi-layer films and sheets are provided. The adhesive compositions contain an olefin polymer base resin, a modified polyolefin and a paraffinic liquid hydrocarbon.

18 Claims, No Drawings

ADHESIVE COMPOSITIONS

This is a continuation of co-pending application Ser. No. 12/462,163 filed Jul. 30, 2009.

FIELD OF THE INVENTION

The invention relates to adhesive compositions having improved properties comprising an olefin polymer base resin, a modified polyolefin and a paraffinic liquid hydrocarbon.

BACKGROUND OF THE INVENTION

Multilayer film structures containing barrier films are frequently used in the food packaging industry for products such as snack foods, meats and cheeses. In these applications, it is desirable for the multilayer structure to demonstrate good adhesion characteristics and clarity. Inferior adhesion properties can result in de-lamination of the film layers in the manufacturing process or in the end-use product. Clarity is an important aesthetic property having direct influence on consumers. Tie layers are often incorporated in multilayer film structures to adhere dissimilar layers which cannot be bonded directly, however, conventional efforts to improve adhesion provided by the tie layer, such as by increasing the level of grafted material in the tie layer composition, can result in a corresponding deterioration in clarity. This unfortunate result can sometimes occur in applications using an ethyl vinyl (ethylenevinyl or ethylene-vinyl) alcohol copolymer ("EVOH") barrier layer, where undesirable chemical interaction between the maleic anhydride functionality of the tie layer resin and the EVOH functionality of the barrier layer result in a distorted appearance in the product film, typically described as "orange peel" or "grainy." Clarity can also be affected in the process by which film layers are coextruded, when differences in the viscosities of the molten resins making up adjacent layers cause stress at the layer interface, leading to weavy-type flow instability.

Various adhesive mixtures have been described in U.S. Pat. Nos. 4,087,587; 4,298,712; 4,487,885; 4,774,144, 5,367,022, 5,439,974, 5,525,672, 5,597,865, 6,716,928, 6,838,520, 7,125,929 and Pat. Appl. Pub. Nos. 2007/0054142, 2008/0032148 and 2008/0163978. Nevertheless, a continuing need exists for tie layer adhesive compositions in multilayer film applications that provide improved adhesion, while minimizing deterioration in, or improving, film clarity. It has unexpectedly been found that mixtures of an olefin polymer base resin, modified polyolefin and a paraffinic liquid hydrocarbon provide a superior balance of adhesion and clarity in tie layer compositions.

SUMMARY OF THE INVENTION

The present invention relates to an adhesive composition comprising 2 to 30 wt. % of a modified polyolefin, 0.02 to 5 wt. %, of a paraffinic liquid hydrocarbon, and 65 to 98 wt. % of an olefin polymer base resin. The present invention also relates to a multilayer film or sheet comprising the adhesive composition.

DETAILED DESCRIPTION OF THE INVENTION

The adhesive compositions of the invention are comprised of an olefin polymer base resin, a modified polyolefin and a paraffinic liquid hydrocarbon composition.

Olefin Polymer Base Resin

The olefin polymer base resin useful in the adhesive compositions can be a propylene polymer, ethylene polymer or mixtures thereof. When the olefin polymer base resin is propylene polymer, it is selected from propylene homopolymers, random copolymers or impact copolymers of propylene containing up to about 30 wt. % of comonomers selected from ethylene or $C_{4-8}$ α-olefins. When the olefin polymer base resin is a propylene polymer, preferably it is a propylene homopolymer having a crystallinity, as measured by wide angle x-ray diffraction, of greater than 40%, or propylene copolymers preferably containing from 1 to 10 wt. %, more preferably, from 1 to 5 wt. % ethylene. Melt flow rates (MFR) of the propylene polymer, as measured by ASTM D1238, condition 230/2.16, are typically 0.1 to 100 dg/min., preferably, 5 to 50 dg/min.

When the olefin polymer base resin is an ethylene polymer, it is preferably selected from ethylene homopolymers, ethylene copolymers or mixtures thereof, where the comonomer is chosen from propylene, $C_{4-8}$ α-olefins, vinyl carboxylates, acrylic and methacrylic acids and esters, or mixtures thereof. Ethylene homopolymers and ethylene-$C_{4-8}$ α-olefin copolymers include very low density polyethylene (VLDPE), low density polyethylene (LDPE), linear low density polyethylene (LLDPE), medium density polyethylene (MDPE) and high density polyethylene (HDPE). VLDPE is defined as having a density of 0.860 to 0.910 $g/cm^3$, as measured by ASTM D 792. LDPE and LLDPE are defined as having densities in the range 0.910 to 0.930 $g/cm^3$. MDPE is defined as having a density of 0.930 to 0.945 $g/cm^3$. HDPE is defined as having a density of at least 0.945 $g/cm^3$, preferably, from 0.945 to 0.969 $g/cm^3$. The ethylene homopolymers and copolymers typically have melt indexes (MIs), as measured by ASTM D 1238, condition 190/2.16, from 0.01 to 400 dg/min, preferably, from 0.1 to 200 dg/min., more preferably from 1 to 100 dg/min.

Preferably, the olefin polymer base resin is selected from ethylene homopolymers, ethylene copolymers with propylene, ethylene copolymers with $C_{4-8}$ α-olefins or mixtures thereof. Preferably, the olefin polymer base resin has a crystallinity, as measured by either wide angle x-ray diffraction or differential scanning calorimetry, of greater than 30 wt %. More preferably, the olefin polymer base resin is HDPE having a crystallinity greater than 50 wt %, preferably greater than 55 wt %, or LLDPE having a crystallinity greater than 40%, preferably greater than 45 wt %, or mixtures of HDPE and LLDPE.

Modified Polyolefin

The modified polyolefin contains acid or acid derivative functionality, and is obtained by reacting unsaturated carboxylic acids and carboxylic acid anhydrides, or derivatives thereof, with polyethylene or polypropylene under grafting conditions. The grafting monomers, i.e., acid, anhydride or derivative, are incorporated along the polyethylene or polypropylene backbone. When the modified polyolefin is obtained by grafting polyethylene, the polyethylene to be grafted includes ethylene homopolymers and copolymers of ethylene with propylene, butene, 4-methyl pentene, hexene, octene, or mixtures thereof. When the modified polyolefin is obtained by grafting polypropylene, the polypropylene to be grafted includes propylene homopolymers and copolymers of propylene with ethylene or $C_4$-$C_{10}$ α-olefins. Preferably, the modified polyolefin is obtained by grafting polyethylene. More preferably, the polyethylene to be grafted is HDPE or LLDPE.

Carboxylic acids or anhydrides useful as grafting monomers include compounds such as acrylic acid, maleic acid, fumaric acid, citaconic acid, mesaconic acid, maleic anhydride, 4-methyl cyclohex-4-ene-1,2-dicarboxylic acid or anhydride, bicyclo(2.2.2)oct-5-ene-2,3-dicarboxylic acid or anhydride 2-oxa-1,3-diketospiro(4,4)non-7-ene, bicyclo (2.2.1)hept-5-ene-2,3-dicarboxylic acid or anhydride, tetrahydrophthalic acid or anhydride, x-methylbicyclo(2.2.1) hept-5-ene-2,3-dicarboxylic acid or anhydride, nadic anhydride, methyl nadic anhydride, himic anhydride, and methyl himic anhydride. Maleic anhydride is a particularly useful grafting monomer. Acid and anhydride derivatives which can be used to graft the polyethylene or polypropylene include dialkyl maleates, dialkyl fumarates, dialkyl itaconates, dialkyl mesaconates, dialkyl citraconates and alkyl crotonates.

Grafting is accomplished by thermal or mechanical means in accordance with known procedures, generally by heating a mixture of the polyolefin and graft monomer(s), with or without a solvent. Preferably, the grafted products are prepared by melt blending the polyethylene or polypropylene in the substantial absence of a solvent, with a free radical generating catalyst, such as an organic peroxide, in the presence of the grafting monomer in a shear-imparting reactor, such as an extruder. Twin screw extruders such as those marketed by Werner-Pfleiderer under the designations ZSK-30, ZSK-53, ZSK-83, ZSK-90 and ZSK-92 are especially useful for carrying out the grafting operation. Preferably, the amount of acid or acid derivative comonomer(s) grafted onto the polyethylene or polypropylene can range from about 0.1 to about 4 weight percent, preferably from 0.5 to 3.0 weight percent. Preferably, when maleic anhydride is grafted onto HDPE or LLDPE, the grafted maleic anhydride concentration is 0.5 to 4 weight percent. Melt indexes of the modified ethylene polymers are preferably 1 to 20 dg/min.

The grafting reaction is carried out at a temperature selected to minimize or avoid rapid vaporization and consequent losses of the graft monomer and any catalyst that may be employed. The graft monomer concentration in the reactor is typically about 1 to about 5 wt. % based on the total reaction mixture weight. A temperature profile where the temperature of the polyolefin melt increases gradually through the length of the extruder/reactor up to a maximum in the grafting reaction zone and then decreases toward the reactor exit is preferred. The maximum temperature within the reactor should be such that significant vaporization losses and/or premature decomposition of any peroxide catalyst are avoided. The grafting monomer and any catalyst used are preferably added in neat form to the extruder/reactor.

Paraffinic Liquid Hydrocarbon

The paraffinic liquid hydrocarbons useful in the adhesion compositions preferably have a viscosity, as measured by ASTM D445, of 85 to 1600 cSt, a viscosity index, as measured by ASTM D2270, of 85 to 190, and a flash point, as measured by ASTM D92, of 225 to 310° C. Preferably, the paraffinic liquid hydrocarbons are selected from mineral oils, polyalphaolefin polymers (PAO) or mixtures thereof. Mineral oils are mixtures of refined paraffinic and naphthenic hydrocarbons obtained by a variety of refining steps such as distillation, extraction and crystallization, purified by acid treatment and/or catalytic hydrotreating. PAO's are synthetic oils formed by polymerization of higher alpha-olefins such as 1-octene, 1-nonene and 1-decene, as described, for example, in U.S. Pat. No. 5,171,908. When the paraffinic liquid hydrocarbon is a mineral oil, the viscosity is preferably 90 to 130 cSt, the viscosity index is preferably 90 to 110 and the flash point is preferably 240 to 275° C. The mineral oil also preferably has a molecular weight, as measured by ASTM D2502, of 530 to 570, a 5% point, as measured by ASTM D2887, of 780 to 820° C., and a specific gravity, as measured by ASTM D4052, of 0.860 to 0.880 g/cm$^3$. When the paraffinic liquid hydrocarbon is a PAO, the viscosity is preferably 375 to 1600 cSt, the viscosity index is preferably 130 to 180, and the flash point is preferably 260 to 300° C. The PAO preferably also has a molecular weight of 2000 to 3200 and a specific gravity of 0.840 to 0.860 g/cm$^3$.

Adhesive compositions of the invention typically contain 2 to 30 wt. % modified polyolefin, 0.02 to 5 wt. % paraffinic liquid hydrocarbon, and 65 to 98 wt % of an olefin polymer base resin. Preferably, the adhesive composition contains 4 to 25 wt % modified polyolefin, 0.05 to 3 wt % paraffinic liquid hydrocarbon, and 72 to 96 wt % olefin polymer base resin. More preferably, the adhesive composition contains 7 to 15 wt % modified polyolefin, 0.1 to 2 wt % paraffinic liquid hydrocarbon, and 83 to 93 wt % olefin polymer base resin.

Additives, Stabilizers, and Fillers

The adhesive compositions of the invention can further comprise additives such as stabilizers, UV absorbers, metal deactivators, thiosynergists, peroxide scavengers, basic co-stabilizers, acid scavengers, nucleating agents, clarifiers, conventional fillers, dispersing agents, plasticizers, lubricants, emulsifiers, pigments, flow-control agents, optical brighteners, flame-proofing agents, antistatic agents, blowing agents, and mixtures thereof, which can be added in amounts well known to those skilled in the art.

The adhesives can be prepared by any conventional method well known to those skilled in the art, where combination of the components can be conducted in any sequence. For example, all of the components can be first blended in conventional blending equipment, with the blended material then being extruded. Alternately, some of the components can be blended prior to extrusion, with the remainder of the components being introduced after blending but upstream of the extruder, or at the extruder itself. The components can also be combined in a series of extrusion steps.

Multilayer Films

The adhesive compositions of the invention are suitable as tie-layers for bonding one or more polyolefin, ionomer, polyester, polyamide, ethylene-vinyl alcohol copolymer and metal layers in multi-layer constructions. The adhesive compositions can be used in lamination, extrusion and coextrusion processes, e.g., blown or cast film extrusion/coextrusion, sheet extrusion/coextrusion, extrusion/coextrusion lamination, extrusion/coextrusion coating, injection blow molding, melt thermoforming and the like for flexible structures. Polyolefin resins which can be adhered with the adhesive compositions of the invention include ethylene and propylene homopolymers and copolymers of ethylene with $C_{3-8}$ alpha-olefins, alkyl(meth)acrylates and vinyl carboxylates. Representative resins of this type include, but are not limited to, LDPE, LLDPE, HDPE, PP, ethylene-vinyl acetate copolymer (EVA), ethylene-methyl acrylate copolymer (EMA) and ethylene-n-butyl acrylate copolymer (EnBA). Polybutylene terephthalate is one example of a useful polyester resin. Typical polyamides can include nylon 6, nylon 6,6, nylon 12, nylon 6,12 and nylon 6,66. EVOH obtained by the saponification/hydrolysis of EVA is also a highly useful resin to impart barrier properties, particularly for film applications. Metals typically employed in multilayer constructions are primarily sheets and foils of aluminum, copper and steel.

The adhesive compositions can also be used in rigid and semi-rigid structures containing structural layers as commonly used for food packaging or food storage applications. A typical construction of this type would include one or more food contact or sealing layers, a barrier layer and one or more structural layers. Food contact/sealing layers often include non-polar polyolefins, e.g., LDPE, while typical barrier layers comprise substrates of EVOH polyamides or the like. Structural layers may comprise styrene polymers which may also contain rubber. High impact polystyrene (HIPS) is widely used as a structural layer, given its desirable physical properties, ease of extrusion processing, thermoforming and cutting.

The following examples illustrate the invention; however, those skilled in the art will recognize numerous variations within the spirit of the invention and scope of the claims.

Adhesive compositions of the examples were prepared using the following olefin polymer base resin, modified polyolefin, and paraffinic liquid hydrocarbon components:

BR-1 LLDPE having a density of 0.919 g/cm$^3$ and an MI of 2.0 dg/min., commercially available from Equistar Chemicals LP.

BR-2 LLDPE having a density of 0.918 g/cm$^3$ and an MI of 2.0 dg/min., commercially available from Equistar Chemicals LP.

BR-3 LLDPE having a density of 0.916 g/cm$^3$ and an MI of 1.0 dg/min., commercially available from Equistar Chemicals LP.

Mgraft-1 HDPE grafted with 1.9 wt. % maleic anhydride, having an MI of 9.5 dg/min and a density of 0.952 g/cm$^3$, commercially available from Equistar Chemicals LP.

Mgraft-2 HDPE grafted with 1.65 wt % maleic anhydride, having an MI of 6.5 dg/min and a density of 0.952 g/cm$^3$, commercially available from Equistar Chemicals LP.

PLH-1 Duoprime-500, a mineral oil commercially available from Equistar Chemicals LP, having a viscosity of 103 cSt, a viscosity index of 103, a flash point of 265° C., a molecular weight of 550 g/g-mole, a 5% point of 800° F., and a specific gravity of 0.870 g/cm$^3$.

PLH-2 Elevast C-30, a polyalphaolefin commercially available from ExxonMobil Chemical, having a viscosity of 396 cSt, a viscosity index of 147, a flash point of 285° C., a molecular weight of 2200 g/g-mole, and a specific gravity of 0.850 g/cm$^3$.

Preparation of Adhesive Composition

Unless otherwise specified, adhesive compositions utilized in the examples were prepared by melt blending the base resin (BR-1, BR-2, BR-3), modified polyolefin (Mgraft-1, Mgraft-2), paraffinic liquid hydrocarbon (PLH-1, PLH-2), and additives using a ZSK30 twin screw extruder operating at 230 rpm, with the following temperature profile:

| Zone | zone 1 | zone 2 | zone 3 | zone 4 | zone 5 | zone 6 | zone 7 | adapter | Die |
|---|---|---|---|---|---|---|---|---|---|
| Temp, ° C. | 160 | 210 | 215 | 220 | 220 | 220 | 220 | 215 | 215 |

The melt-blended extrudates were then pelletized. Unless otherwise specified, when paraffinic liquid hydrocarbons were included in the adhesive blends, paraffinic liquid hydrocarbon master batches (MB) were prepared by first mixing the paraffinic liquid hydrocarbon in a 1:1 ratio with acetone to form a homogeneous mixture, and then combining it with the base resin to produce a mixture containing 1.5 wt % of the liquid paraffinic hydrocarbon. The admixture was then settled overnight to evaporate the acetone. Following evaporation, 20% of the MB was blended with the base resin to form a mixture containing the desired level of liquid paraffinic hydrocarbon in the adhesive blend.

Adhesion Testing—Preparation of Film

Five-layer coextruded cast films having a thickness of 3 or 5 mils were prepared on a Killion extruder with an A/B/C/B/A structure, where the skin layer A was M6210, an HDPE having an MI of 0.95 and a specific gravity of 0.958 g/cm$^3$, commercially available from Equistar Chemicals LP, the tie layer B was the adhesive composition, and the barrier layer C was EVOH (Soarnol DC3203FB), commercially available from Nippon Gohsei Kagaku K.K. The layer distribution was 43% HDPE/3% Tie/8% EVOH/3% Tie/43% HDPE. Temperature profiles, in degrees Fahrenheit, of each layer were as follows:

| | zone 1 | zone 2 | zone 3 | adapter | Die |
|---|---|---|---|---|---|
| HDPE skin layer (A), ° F. | 360 | 390 | 410 | 410 | 410 |
| Tie Layer (B), ° F. | 350 | 380 | 400 | 410 | 410 |
| EVOH (C), ° F. | 380 | 380 | 390 | 410 | 410 |

Adhesion Measurement

Adhesion was determined by ASTM method D1876 by cutting 25.4 mm wide strips in the machine direction near the center of the coextruded film. Each strip was separated at the tie/EVOH interface. The force required to separate the film apart in a T-Peel configuration at 254 (10") mm/min was measured using an Instron tensile tester. The average adhesion of five specimens was recorded as the peel strength in lb/in.

Clarity Testing—Preparation of Film

Five-layer coextruded cast films having a thickness of 5 mils were prepared on a Killion extruder with an A/B/C/B/A structure where the skin layer A was UE624, an ethyl(enevinyl or ethylene-vinyl) acetate copolymer containing 18% vinyl acetate and having an MI of 2.1, commercially available from Equistar Chemicals LP, the tie layer B was the adhesive composition, and the barrier layer C was EVOH (Soarnol DC3203FB). The layer distribution was 36% EVA/7% Tie/ 14% EVOH/7% Tie/36% EVA. Temperature profiles, in degrees Fahrenheit, of each layer were as follows:

| | zone 1 | zone 2 | zone 3 | adapter | die |
|---|---|---|---|---|---|
| EVA skin layer (A), ° F. | 350 | 390 | 400 | 410 | 410 |
| Tie Layer (B)), ° F. | 350 | 390 | 400 | 410 | 410 |
| EVOH (C)), ° F. | 380 | 380 | 400 | 410 | 410 |

Clarity Testing—Measurement

Film clarity was measured by narrow angle scattering (NAS) measurements using a Zebedee CL-100 clarity meter. The multilayer film specimens were cut into 10 cm×10 cm squares and adhered to the test unit in front of the light source by air suction. Films were oriented in the same direction and tested in the same fashion to minimize testing variables. A minimum of seven specimens were run for each NAS sample. Higher NAS indicates improved clarity of the film sample.

CONTROL EXAMPLE 1

An adhesive composition containing 90.0 wt. % BR-1 and 10.0 wt % Mgraft-1.

EXAMPLE 2

An adhesive composition containing 89.7 wt. % BR-1, 10.0 wt. % Mgraft-1, and 0.3 wt % PLH-1.

EXAMPLE 3

An adhesive composition containing 89.7 wt. % BR-1, 10.0 wt. % Mgraft-1, and 0.3 wt % PLH-2.

Adhesive compositions were prepared according to Control Example 1, and Examples 2-3, and 3- and 5-mil films prepared. Adhesion and clarity testing was performed on the films, and the data is summarized in Table 1.

TABLE 1

| Sample | 3-Mil Film Adhesion, lb-in | 5-Mil Film Adhesion, lb-in | NAS, % |
|---|---|---|---|
| Control 1 | 0.75 | 1.17 | 14.3 |
| Example 2 | 0.83 | 1.43 | 16.9 |
| Example 3 | 0.81 | 1.40 | 20.6 |

CONTROL EXAMPLE 4

An adhesive composition containing 89.84 wt. % BR-2, 10.0 wt % Mgraft-1, 0.06 wt % Irganox 1076, and 0.1 wt % Irgafos 168, both Irganox 1076 and Irgafos 168 being commercially available from Ciba Specialty Chemical Company.

EXAMPLE 5

An adhesive composition containing 89.54 wt. % BR-2, 10.0 wt. % Mgraft-1, 0.06 wt % Irganox 1076, 0.1 wt % Irgafos 168 and 0.3 wt % PLH-1.

CONTROL EXAMPLE 6

An adhesive composition containing 95.86 wt. % BR-2, 4.0 wt % Mgraft-2, 0.03 wt % Irganox 1076, 0.07 wt % Irgafos 168, and 0.04 wt % Irganox 1010.

EXAMPLE 7

An adhesive composition containing 95.56 wt. % BR-2, 4.0 wt. % Mgraft-2, 0.03 wt % Irganox 1076, 0.07 wt % Irgafos 168, 0.04 wt % Irganox 1010 and 0.3 wt % PLH-1, Irganox 1010 being commercially available from Ciba Specialty Chemical Company.

Adhesive compositions were prepared according to Control Examples 4 and 6, and Examples 5 and 7 using a Baker-Perkins 125 mm twin screw extruder for the mixing section, where the PLH-1 was added directly to the extruder feed, followed by pelletization using a Davis Standard single screw extruder. The temperature profile in the mixing section was 350° F. and in the pelletization zone was 370° F. 3 and 5 mil films were then prepared. Adhesion testing was performed on the films, and the data is summarized in Tables 2-3.

TABLE 2

| Sample | Adhesion, lb-in 3-Mil Film | 5-Mil Film |
|---|---|---|
| Control Ex. 4 | 0.88 | 1.67 |
| Example 5 | 1.14 | 2.34 |

TABLE 3

| Sample | Adhesion, lb-in 3-Mil Film | 5-Mil Film |
|---|---|---|
| Control Ex. 6 | 0.58 | 0.89 |
| Example 7 | 0.65 | 1.15 |

COMPARATIVE EXAMPLE 8

An adhesive composition containing 90.0 wt. % BR-3, and 10.0 wt. % Mgraft-1.

COMPARATIVE EXAMPLE 9

An adhesive composition containing 89.0 wt. % BR-3 and 11.0 wt. % Mgraft-1.

Adhesive compositions were prepared according to Comparative Examples 8-9. Adhesion and clarity testing was performed on the films, and the data is summarized in Table 4. These examples illustrate that increased percentages of grafted material increase adhesion, but at the cost of a deterioration in clarity.

TABLE 4

| Sample | 5-Mil Data Adhesion, lb-in | NAS, % |
|---|---|---|
| Comparative Example 8 | 2.79 | 12.7 |
| Comparative Example 9 | 3.01 | 7.5 |

CONTROL EXAMPLE 10

An adhesive composition containing 89.90 wt. % BR-1, 10.0 wt % Mgraft-1, 0.05 wt % Irganox 1010 and 0.05 wt % Irgafos 168.

EXAMPLE 11

An adhesive composition containing 89.87 wt. % BR-1, 10.0 wt. % Mgraft-1, 0.05 wt % Irganox 1010, 0.05 wt % Irgafos 168, and 0.03 wt % PLH-1.

EXAMPLE 12

An adhesive composition containing 89.6 wt. % BR-1, 10.0 wt. % Mgraft-1, 0.05 wt % Irganox 1010, 0.05 wt % Irgafos 168, and 0.3 wt % PLH-1.

EXAMPLE 13

An adhesive composition containing 88.4 wt. % BR-1, 10.0 wt. % Mgraft-1, 0.05 wt % Irganox 1010, 0.05 wt % Irgafos 168, and 1.5 wt % PLH-1.

Adhesive compositions were prepared according to Control Example 10, and Examples 11-13. 3 and 5 mil films were then prepared. Adhesion and clarity testing was performed on the films, and the data is summarized in Table 5. The data illustrates improved adhesion in the films while maintaining clarity.

TABLE 5

| Sample | 3-Mil Film Adhesion, lb-in | 5-Mil Film Adhesion, lb-in | NAS, % |
|---|---|---|---|
| Control Ex. 10 | 0.95 | 1.87 | 15.5 |
| Example 11 | 1.05 | 1.90 | 15.7 |
| Example 12 | 1.16 | 2.31 | 14.6 |
| Example 13 | 1.17 | 2.36 | 15.8 |

We claim:

1. An adhesive comprising:
  (a) 2 to 30 wt. % of a modified polyethylene grafted with carboxylic acids, carboxylic acid anhydrides or derivatives thereof,
  (b) 0.02 to 5 wt. % of a mineral oil, synthetic oil, and mixtures thereof; and
  (c) 65 to 98 wt. % of an olefin polymer base resin.

2. The adhesive of claim 1 wherein the modified polythylene is obtained by grafting an HDPE.

3. The adhesive of claim 1 wherein the modified polythylene is obtained by grafting an LLDPE.

4. The adhesive of claim 1 wherein the modified polythylene is a polyethylene grafted with maleic anhydride.

5. The adhesive of claim 1 wherein the modified polythylene is an LLDPE grafted with maleic anhydride.

6. The adhesive composition of claim 1 wherein the olefin polymer base resin is a propylene homopolymer; copolymer of propylene with up to about 30 wt. % of a comonomer selected from ethylene or $C_{4-8}$ α-olefins; ethylene homopolymer; ethylene copolymer with a comonomer selected from propylene, $C_{4-8}$ α-olefins, vinyl carboxylates, acrylic and methacrylic acids and esters, or mixtures thereof.

7. The adhesive of claim 1 wherein the olefin polymer base resin is propylene, ethylene or a mixture thereof.

8. The adhesive of claim 1 wherein the olefin polymer base resin is ethylene.

9. The adhesive of claim 1 wherein the olefin polymer base resin is LLDPE.

10. The adhesive of claim 3 wherein the LLDPE has a crystallinity greater than 50 wt. %.

11. The adhesive composition of claim 1 wherein the mineral oil, synthetic oil, and mixtures thereof is present in an amount from 0.05 to 3 wt. %.

12. The adhesive composition of claim 1 wherein the mineral oil, synthetic oil, and mixtures thereof is present in an amount from 0.1 to 2 wt. %.

13. The adhesive composition of claim 1 further comprising a clarifier.

14. The adhesive composition of claim 1 further comprising a nucleator.

15. The adhesive composition of claim 1 further comprising a lubricant.

16. The adhesive composition of claim 1 further comprising an emulsifier.

17. The adhesive composition of claim 1 further comprising an antistatic agent.

18. The adhesive composition of claim 1 further comprising an optical brightener.

* * * * *